(12) United States Patent
Caplan et al.

(10) Patent No.: US 7,877,324 B2
(45) Date of Patent: Jan. 25, 2011

(54) METHOD AND SYSTEM FOR ISSUING LETTERS OF CREDIT

(75) Inventors: Rick Caplan, Harrison, NY (US);
Marcy Engel, Scarsdale, NY (US);
Steve Incontro, New York, NY (US);
Stanley Louie, Brooklyn, NY (US);
Frank Pertusiello, New York, NY (US)

(73) Assignee: Citigroup Global Markets, Inc., New York, NY (US)

( * ) Notice: Subject to any disclaimer, the term of this patent is extended or adjusted under 35 U.S.C. 154(b) by 913 days.

(21) Appl. No.: 11/019,376

(22) Filed: Dec. 22, 2004

(65) Prior Publication Data

US 2006/0136331 A1 Jun. 22, 2006

(51) Int. Cl.
*G06Q 40/00* (2006.01)
(52) U.S. Cl. .......................................... 705/39; 705/35
(58) Field of Classification Search ................... 705/64, 705/35, 37, 40, 39
See application file for complete search history.

(56) References Cited

U.S. PATENT DOCUMENTS

2004/0172368 A1* 9/2004 Johnson ...................... 705/64

OTHER PUBLICATIONS

Steiner, Beat (Real Property Probate & Trust Journal v28 n1 pp. 125-176 Spring 1993 ISSN: 0034-0855 Journal Code: ARPP).*

* cited by examiner

*Primary Examiner*—Ojo O Oyebisi
(74) *Attorney, Agent, or Firm*—Milbank, Tweed, Hadley & McCloy LLP (57) ABSTRACT

A system and method for issuing letters of credit. The system and method issue a first letter of credit from a second party to a third party, and issue at least one second letter of credit from the third party to at least one fourth party. The system and method also provide a credit facility from the second party to a first party, the credit facility associated with the first and second letters of credit. The system and method also transfer credit risk from the credit facility to at least one fifth party under a participation agreement.

25 Claims, 6 Drawing Sheets

METHOD AND SYSTEM FOR ISSUING LETTERS OF CREDIT

BACKGROUND

The invention relates to the field of banking and finance, and more particularly to the field of hedging credit risk associated with letters of credit.

In the finance and banking area, letters of credit are known. For a typical letter of credit, a company arranges for a bank to issue letters of credit to beneficiaries, with a promise from the company to reimburse the bank for any draw by the beneficiary on the letter of credit. The letter of credit may be part of a larger credit facility made available to the company by the bank.

In most contexts, the dollar value of the credit facility consumes credit capacity and impacts the bank's regulatory capital requirements, such that the aggregate dollar value of all the credit facilities a bank makes available is limited. Banks would like to be able to increase their capacity to provide credit facilities and associated letters of credit, without adversely impacting their regulatory capital.

What is needed are systems and methods in a manner that allow banks to efficiently transfer credit risk from credit facilities and associated letters of credit to the capital markets in a matter that also reduces the impact on their regulatory capital requirements.

The preceding description is not to be construed as an admission that any of the description is prior art relative to the present invention.

SUMMARY OF THE INVENTION

In one embodiment, the invention provides a system and method for issuing letters of credit. The system and method issue a first letter of credit from a second party to a third party, and issue at least one second letter of credit from the third party to at least one fourth party. The system and method also provide a credit facility from the second party to a first party, the credit facility is associated with the first and second letters of credit. The system and method also transfer credit risk from the credit facility to at least one fifth party under a participation agreement.

In another embodiment, the system and method execute a first agreement between the first party and the third party, the first agreement including an obligation by the first party to reimburse the third party in the event of a predetermined condition.

In another embodiment, the system and method execute a second agreement between the first party and the second party, the second agreement including an obligation by the first party to reimburse the second party in the event of a predetermined condition.

In another embodiment, the system and method grant the third party a right to draw on the first letter of credit in the event of a predetermined condition.

In another embodiment, the system and method grant the fourth party a right to draw on the second letter of credit in the event of a predetermined condition.

In another embodiment, the system and method receive funds from the fifth party.

In another embodiment, the system and method purchase an investment product with at least part of the received funds.

In another embodiment, the system and method provide a return to the fifth party on the investment product.

In another embodiment, the system and method provide a return to the fifth party under the participation agreement.

In another embodiment, the system and method receive funds from the fifth party, and hold the funds in an account maintained by a sixth party.

In another embodiment, the system and method receive funds from the fifth party, and invest the funds in an investment product held or managed by a sixth party.

In another embodiment, the system and method receive a pledge of the investment product from the sixth party under a collateral agreement.

In another embodiment, the first letter of credit has a value and the second letters of credit have an aggregate value. The system and method further adjust the value of the first letter of credit in association with a change in the aggregate value of the second letters of credit.

In another embodiment, the system and method transfer credit risk from the credit facility to a sixth party in association with transferring credit risk from the credit facility to at least one fifth party, wherein the majority of the credit risk is transferred to the fifth party.

In another embodiment, the system and method transfer credit risk from the credit facility to a sixth party before transferring credit risk from the credit facility to the at least one fifth party. After transfer of credit risk to the sixth party, the system and method transfer all of the credit risk from the credit facility held by the sixth party to the fifth party.

In another embodiment, the system and method transfer credit risk from the credit facility to at least one fifth party. The system and method further transfer credit risk from the credit facility through a sixth party to the at least one fifth party.

In another embodiment, the system and method include a right to assign some or all rights or obligations as an element of the credit facility.

In another embodiment, the system and method assign rights to receive payment under the credit facility to the fifth party.

In another embodiment, the system and method issue a plurality of second letters of credit.

In another embodiment, the system and method execute a first agreement between the first party and the third party, the first agreement including an obligation by the first party to reimburse the third party in the event of a first predetermined condition. The system and method also execute a second agreement between the first party and the second party, the second agreement including an obligation by the first party to reimburse the second party in the event of a second predetermined condition, wherein the first and second predetermined conditions are different.

In another embodiment, the second predetermined condition allows a draw on the first letter of credit even if the first predetermined condition is not satisfied.

In another embodiment, the second and third parties are able to share or combine regulatory capital requirements.

The foregoing are illustrative of the objects or advantages of the various embodiments that can be achieved, and are not intended to be exhaustive or limiting of the possible objects or advantages that can be realized. Thus, the objects and advantages will be apparent from the description herein or can be learned from practicing the invention, both as embodied herein or as modified in view of any variations which may be apparent to those skilled in the art. Accordingly, the present invention resides in the novel parts, constructions, arrangements, combinations and improvements herein shown and described.

BRIEF DESCRIPTION OF THE DRAWINGS

The foregoing features and other aspects of the embodiments of the invention are explained in the following description taken in conjunction with the accompanying figures wherein.

It is understood that the drawings are for illustration only and are not limiting.

DETAILED DESCRIPTION OF THE DRAWINGS

In one embodiment, the invention provides a structure that allows banks to hedge or transfer to the capital markets some or all of the credit risk that is associated with the issue of letters of credit. This structure provides a number of advantages. It primarily addresses a bankruptcy issue that is inherent in the issuance of a letter of credit: the conditions for a draw under the letter of credit do not generally include the occurrence of a credit event, which includes bankruptcy or failure to pay with respect to the applicant. As a result, a bank is not able to hedge itself efficiently because if the applicant experiences a credit event and the beneficiary does not draw on the letter of credit, the bank will not have a loan that it can deliver to satisfy its hedges. In one embodiment, the invention includes a back-to-back letter of credit structure that allows the bank to retain control of the timing of the draw within the consolidated group so that it may achieve more efficient hedging. As a result, under this structure, banks will be able to offer letters of credit facilities with bond-like terms: longer tenure, fixed rate for the life of the facility, and bond covenants, which are less restrictive than those required by the banks. Additionally, this structure further increases the efficiency of the bank's use of capital, allowing it to service a larger customer base and maintain a larger portfolio of products. As another advantage, this structure allows investors who have assumed the credit risk to more directly participate in the return from the credit facility, an investment that has traditionally been a bank product rather than a capital markets product.

An Example System

Figure 1:
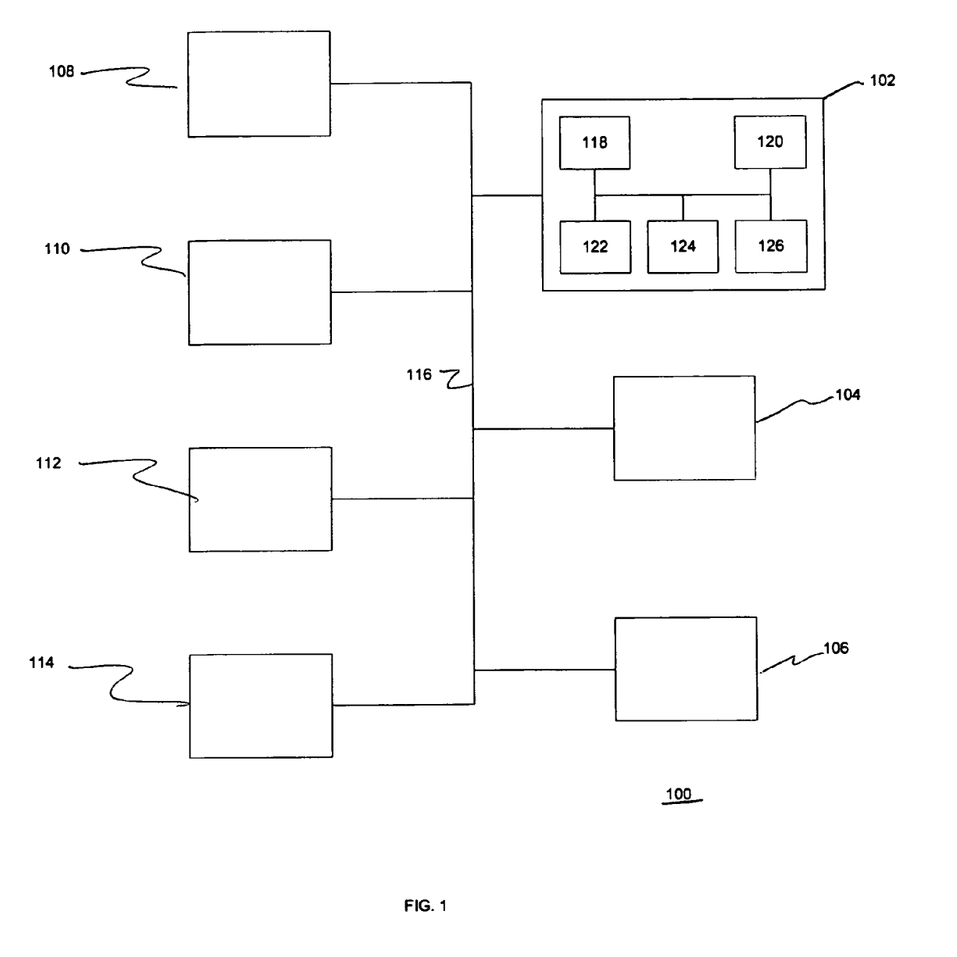
FIG. 1 illustrates a system according to one embodiment of the invention.

Referring to FIG. 1, a system 100 according to one embodiment of the invention includes a plurality of parties (102 through 114). Most or all of the parties are interconnected by network 116. Although not fully illustrated, parties 102 through 114 each typically include computer elements, such as a central processor (118), input-output device (120), code storage device (122), display device (124), and network interconnection device (126), all typically connected through a buss.

In various embodiments, central processor 118 includes a single processor in a single computer, multiple processors in a single computer, and multiple processors in multiple computers Embodiments for input-output device 120 include keyboards, pointing devices, and serial ports. Embodiments for code storage device 122 include fixed or removable magnetic media (e.g., hard disk drives, or floppy drives); CD; DVD; and memory stick. Embodiments for display device 124 include video monitors, LCDs, and printers. Network interconnection device 126 includes wired and wireless network connection cards. Although, there are many possible embodiments for central processor 118, input-output device 120, code storage device 122, display device 124 and network interconnection device 126, their precise form is not a particular feature of the invention, and equivalents of the described examples are clearly envisioned.

Example Embodiments

Figure 2:
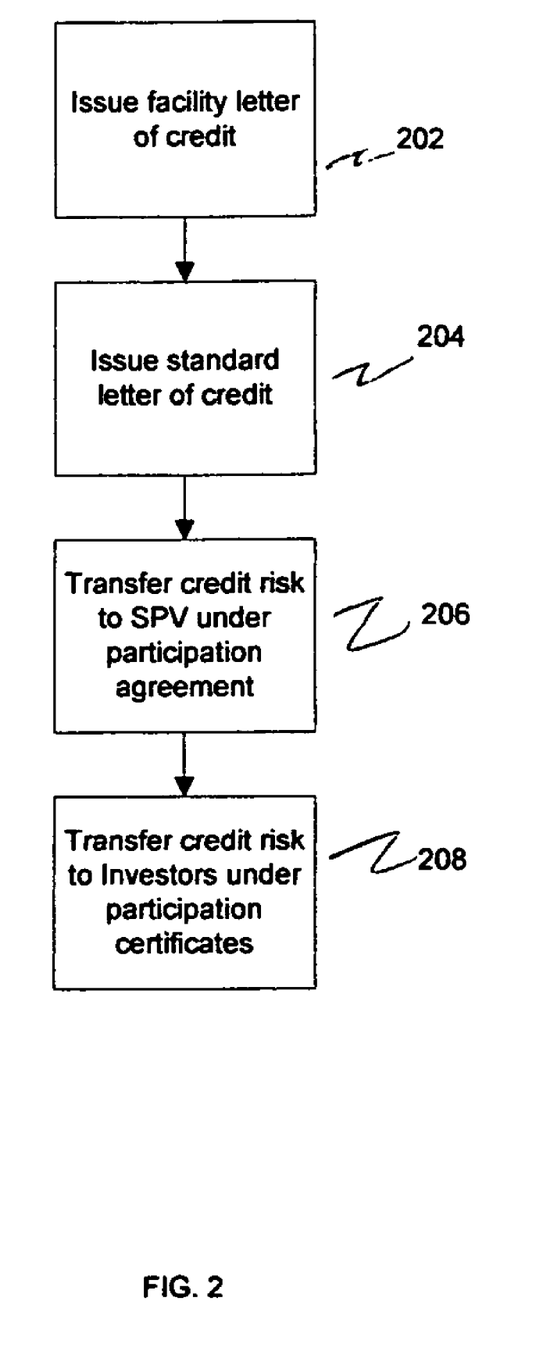
FIG. 2 illustrates steps in a method according to one embodiment of the invention.
Figure 3:
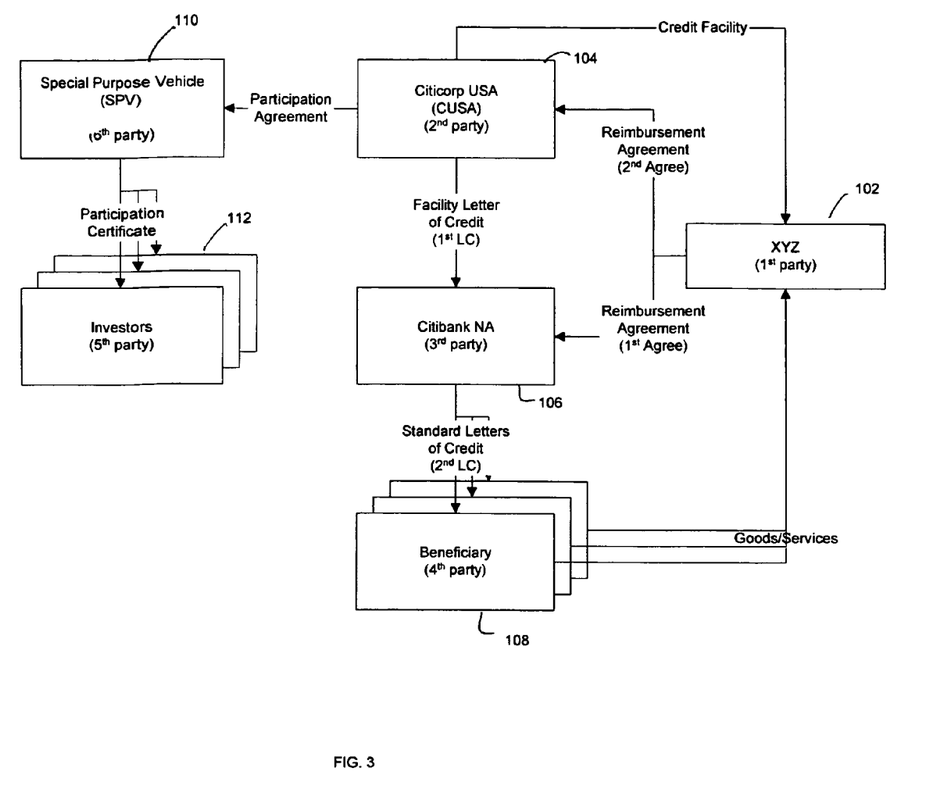
FIG. 3 illustrates one embodiment of the invention.

In an example, as illustrated in FIGS. 2 and 3, at step 202, Citicorp USA ("CUSA") (104) issues a facility letter of credit to Citibank under a revolving credit facility based on company XYZ's existing bank revolvers, which may be used to support standard letters of credit and other short-term borrowing. Although not illustrated, company XYZ may draw any excess capacity under the credit facility for other short-term funding needs.

At step 204, Citibank N.A. ("Citibank") (106) issues at least one standard letter of credit to a beneficiary (108) on behalf of company XYZ (102) as part of a revolving credit facility. This is done at approximately the same time as the facility letter of credit, and the amount of the facility letter of credit is generally equal to the value of the standard letters of credit issued by Citibank to the beneficiaries.

In one embodiment, the standard letters of credit issued by Citibank to the beneficiaries follows the standard evergreen letter of credit format and are structured as 364-day facilities. For the duration of the credit facility, the standard letters of credit will automatically roll over. In one embodiment, the standard letters of credit are term letters of credit, provided certain termination events are included.

The facility letter of credit provides a mechanism for Citibank and CUSA to more efficiently transfer their credit exposure to the capital markets, and is one part of the product features that allows reduction of regulatory capital requirements. Under the terms of the facility letter of credit, Citibank may draw on the facility letter of credit if there is a credit event with respect to company XYZ, or if Citibank is not reimbursed for a draw on the standard letter of credit issued by Citibank. A credit event may include a number of events recognized in the industry as a credit event, such as bankruptcy or failure to pay. In either, case, the timing and the conditions under which the facility letter of credit will be drawn are known.

Upon a draw by Citibank on the facility letter of credit, a loan is automatically created under the credit facility. The loan is a senior unsecured obligation of company XYZ evidencing Citigroup's claim against company XYZ. To ensure that the loan is acceptable to capital markets investors, the loan includes covenants and terms similar to those currently found in a market-standard debt obligation issued by company XYZ.

As part of the transfer of credit risk, company XYZ's loan is delivered to either the fixed income cash market or the credit default swap market, depending on the hedging instrument used. There are a number of available hedging alternatives to effect risk transfer, and may include, but are not limited to, the use of credit default swaps, credit-linked notes or participation certificates.

There are advantages to using credit default swaps, such as ease of execution. However, the credit default swap market has limited demand for long-dated exposures (beyond 5 years) and may impose size constraints because of the current volume of trades in that market.

Similarly, participation certificates also have advantages, such as being executed like a direct company XYZ 144A bond offering in the fixed income market, and they can support greater size and longer maturities than the credit default swap market. However, the offering process is more complicated and requires company XYZ's participation.

In one embodiment, CUSA forms a special purpose vehicle ("SPV") (110), and at step 206, transfers credit risk to the SPV under a participation agreement.

At step 208, after CUSA transfers the credit risk to the SPV, the SPV then transfers the credit risk to one or more investors (112) under participation certificates. Typically, all of the credit risk is transferred from the SPV to the investors at step 208. However, in some cases, a substantial majority of the credit risk is transferred to the investors, and a nominal amount of credit risk remains with the SPV.

Figure 4:
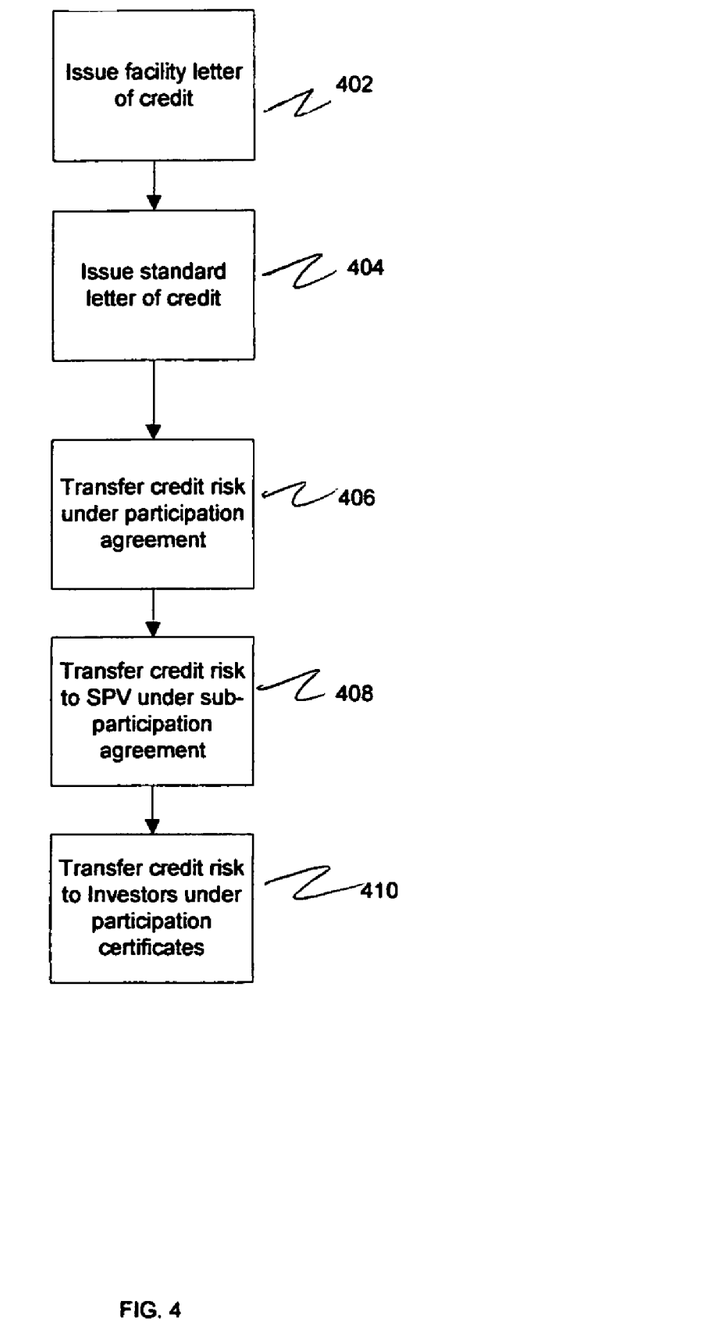
FIG. 4 illustrates steps in a method according to one embodiment of the invention.
Figure 5:
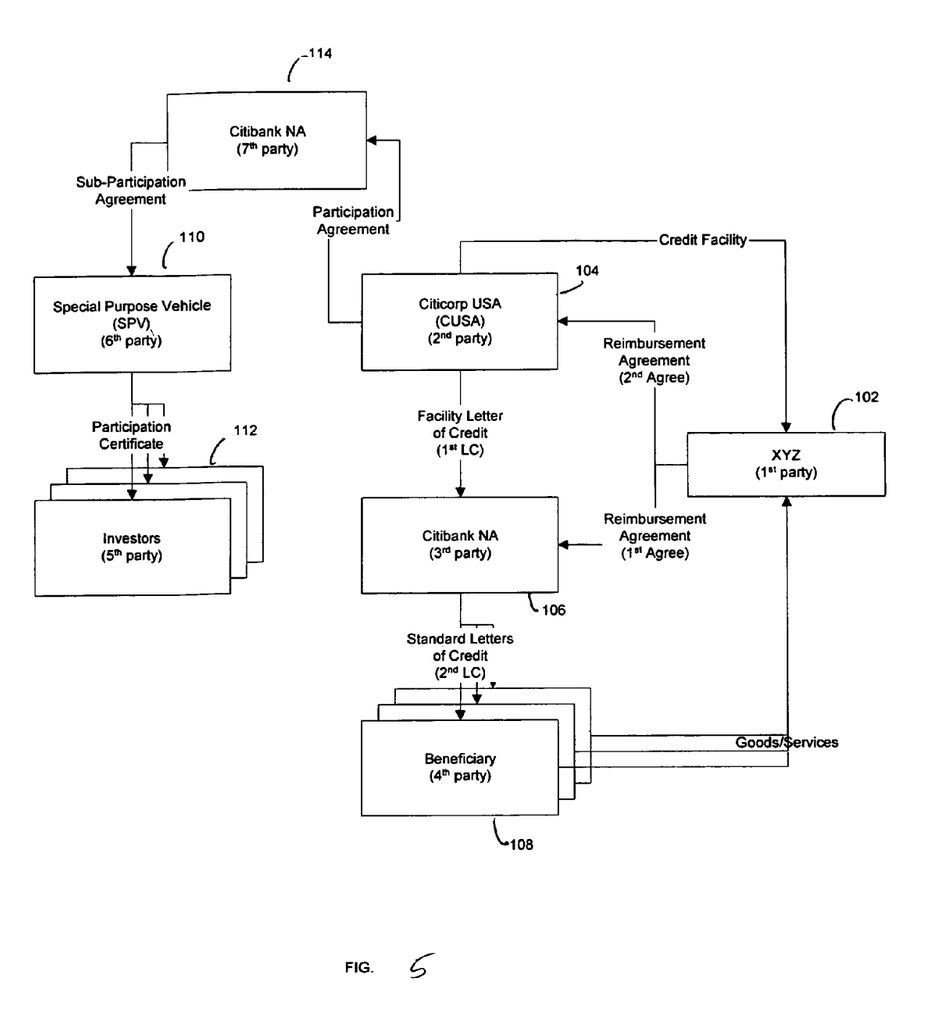
FIG. 5 illustrates one embodiment of the invention.

Having described and illustrated embodiments of the invention above, other embodiments are described and illustrated in FIGS. 4 and 5, where at step 402 a bank (e.g., a third party) (106) arranges a facility letter of credit (e.g., a first letter of credit) between the bank and an affiliated financing entity (e.g., a second party) (104). This facility letter of credit has terms for draw and repayment.

Under another aspect of the invention, at step 404, company XYZ (e.g., a first party) (102) arranges a letter of credit (e.g., a second letter of credit). This second letter of credit may be a standard or traditional letter of credit. Under the terms of this standard letter of credit, the bank agrees to pay a beneficiary (e.g., a fourth party) (108) upon a draw under the terms of the letter of credit. Payment under the letter of credit is permitted if the beneficiary can demonstrate that it has provided agreed-upon goods or services to company XYZ.

In one embodiment, company XYZ agrees to reimburse the facility letter of credit under specific predetermined conditions.

In one embodiment, the terms for draw under the facility letter of credit differ from the terms for draw under the standard letter of credit.

At step 406, the second party transfers credit risk to a seventh party (114) under a participation agreement. Transfer to a seventh party may be desired if the second party is not rated and the fifth party does not want exposure to an unrated party. In one embodiment, the seventh and third party are the same party.

At step 408, the seventh party transfers credit risk to a special purpose vehicle (110) under a sub-participation agreement. At step 410, the SPV transfers credit risk to at least one investor (112).

Figure 6:
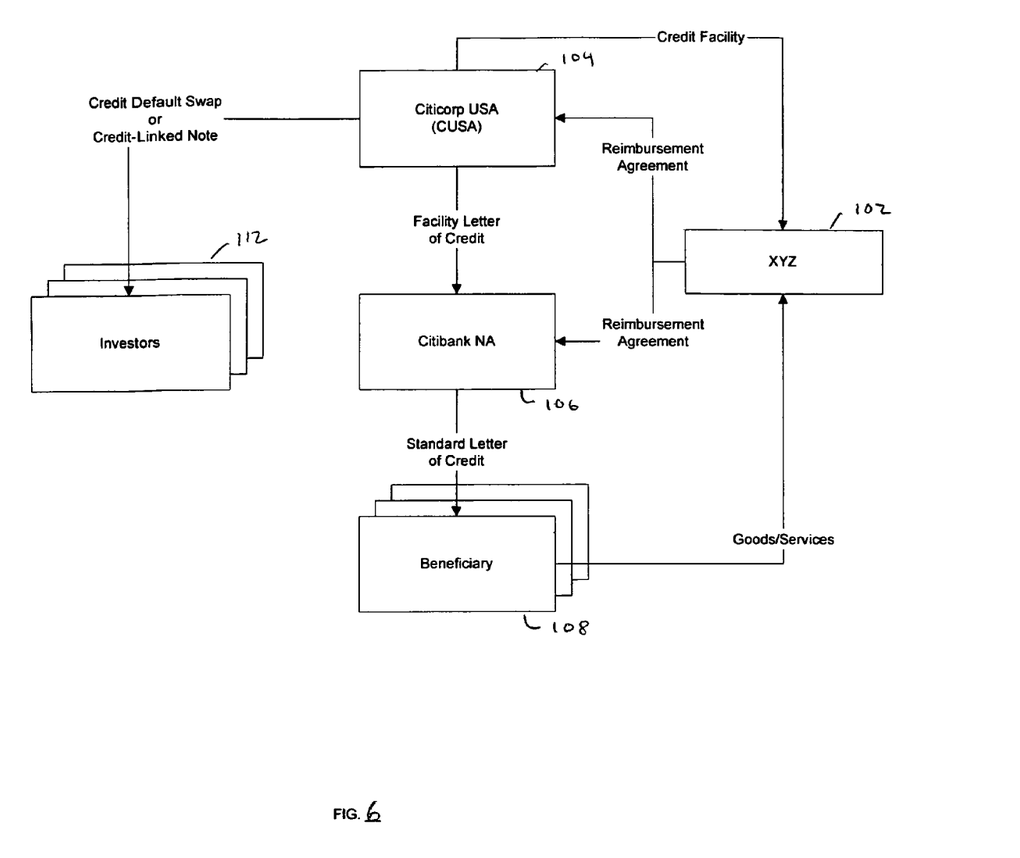
FIG. 6 illustrates one embodiment of the invention.

Referring to FIG. 6, in another embodiment of the invention, similar to the description above, company XYZ (102) arranges for a standard letter of credit from Citibank (106) to beneficiary (108), and at the same time Citibank arranges a facility letter of credit with CUSA (104). In a manner similar to the description above, there are predetermined conditions for draw under the facility letter of credit that differ from the terms for draw under the standard letter of credit.

In these embodiments, to transfer credit risk to the capital markets, CUSA arranges for a Credit Default Swap (CDS) or Credit-Linked Note (CLN) with investors 112. Under the CDS or CLN, the investors assume most or all of the credit risk under the credit facility and/or letter of credit.

In another embodiment of the invention, the investment that is received from investors (112) is deposited with bank 106. In this way, the cash held by bank 106 from investors 112 is available for computing regulatory capital requirements and can thereby positively impact the bank's regulatory capital requirements. The deposit may be a certificate of deposit, or it might be another form of interest bearing account. The investors may receive a return for their investment that is based on the return of the investment product, as well as a return that is based on the transferred credit risk under the participation agreement.

In one embodiment, when the aggregate value of the letters of credit changes, the value of the facility letter of credit also changes.

Although illustrative embodiments have been described herein in detail, it should be noted and will be appreciated by those skilled in the art that numerous variations may be made within the scope of this invention without departing from the principles of this invention and without sacrificing its chief advantages.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

We claim:

1. A method for issuing a letter of credit, the method performed at least partially by a programmed computer and comprising:
    issuing by the programmed computer, a first letter of credit from a second party to a third party;
    issuing by the programmed computer, at least one second letter of credit from said third party to at least one fourth party, wherein the second letter of credit is issued to the at least one fourth party on behalf of a first party and further wherein the third party may draw on the first letter of credit under at least two conditions:
        one condition being a credit event with respect to the first party, and
        another condition being the third party is not reimbursed for a draw on the second letter of credit;
    providing a credit facility from the second party to the first party, the credit facility associated with the first and second letters of credit; and
    transferring credit risk from the credit facility to at least one fifth party under a participation agreement.

2. A method according to claim 1, further comprising: executing a first agreement between the first party and the third party, the first agreement including an obligation by the first party to reimburse the third party in the event of a predetermined condition.

3. A method according to claim 1, further comprising: executing a second agreement between the first party and the second party, the second agreement including an obligation by the first party to reimburse the second party in the event of a predetermined condition.

4. A method according to claim 1, further comprising: granting the fourth party a right to draw on the second letter of credit in the event of a predetermined condition.

5. A method according to claim 1, further comprising: receiving funds from the fifth party.

6. A method according to claim 5, further comprising: purchasing an investment product with at least part of the received funds.

7. A method according to claim 6, further comprising:
providing a return to the fifth party on the investment product.

8. A method according to claim 1, further comprising:
providing a return to the fifth party under the participation agreement.

9. A method according to claim 1, further comprising:
receiving funds from the fifth party; and
holding the funds in an account held by a sixth party.

10. A method according to claim 1, further comprising:
receiving funds from the fifth party; and
investing the funds in an investment product managed by a sixth party.

11. A method according to claim 10, further comprising:
receiving a pledge of the investment product from the sixth party under a collateral agreement.

12. A method according to claim 1, wherein the first letter of credit has a value and the at least one second letter of credit has an aggregate value, the method further comprising:
adjusting the value of the first letter of credit in association with a change in the aggregate value of the at least one second letter of credit.

13. A method according to claim 1, further comprising:
transferring credit risk from the credit facility to a sixth party in association with transferring credit risk from the credit facility to at least one fifth party, wherein the majority of the credit risk is transferred to the fifth party.

14. A method according to claim 1, further comprising:
transferring credit risk from the credit facility to a sixth party before transferring credit risk from the credit facility to the at least one fifth party; and
after transfer of credit risk to the sixth party, transferring all of the credit risk from the credit facility held by the sixth party to the fifth party.

15. A method according to claim 1, wherein transferring credit risk from the credit facility to at least one fifth party further comprises:
transferring credit risk from the credit facility through a sixth party to the at least one fifth party.

16. A method according to claim 15, further comprising:
assigning rights to receive payment under the credit facility to the sixth party.

17. A method according to claim 1, further comprising:
including a right to assign some or all rights or obligations as an element of the credit facility.

18. A method according to claim 1, further comprising:
assigning rights to receive payment under the credit facility to the fifth party.

19. A method according to claim 1, further comprising:
issuing a plurality of second letters of credit.

20. A method according to claim 1, further comprising:
executing a first agreement between the first party and the third party, the first agreement including an obligation by the first party to reimburse the third party in the event of a first predetermined condition; and
executing a second agreement between the first party and the second party, the second agreement including an obligation by the first party to reimburse the second party in the event of a second predetermined condition, wherein the first and second predetermined conditions are different.

21. A method according to claim 20, wherein the second predetermined condition allows a draw on the first letter of credit even if the first predetermined condition is not satisfied.

22. A method according to claim 1, wherein the second and third parties are able to share or combine regulatory capital requirements.

23. A method for issuing a letter of credit, the method performed at least partially by a programmed computer and comprising:
issuing by the programmed computer, a facility letter of credit from a second party to a third party;
issuing by the programmed computer, at least one standard letter of credit from said third party to at least one beneficiary, wherein the standard letter of credit is issued to the at least one beneficiary on behalf of a company and further wherein the third party may draw on the facility letter of credit under at least two conditions:
one condition being a credit event with respect to the company, and
another condition being the third party is not reimbursed for a draw on the standard letter of credit;
providing a credit facility from the second party to the company, the credit facility associated with the facility and standard letters of credit; and
transferring credit risk from the credit facility to at least one investor under a participation certificate.

24. A method for issuing a letter of credit, the method performed at least partially by a programmed computer and comprising:
issuing by the programmed computer, a facility letter of credit from a second party to a third party;
issuing by the programmed computer, at least one standard letter of credit from said third party to at least one beneficiary, wherein the standard letter of credit is issued to the at least one beneficiary on behalf of a company and further wherein the third party may draw on the facility letter of credit under at least two conditions:
one condition being a credit event with respect to the company, and
another condition being the third party is not reimbursed for a draw on the standard letter of credit;
providing a credit facility from the second party to the company, the credit facility associated with the facility and standard letters of credit;
transferring credit risk from the credit facility to a special purpose vehicle under a participation agreement; and
transferring credit risk from the special purpose vehicle to at least one investor under a participation certificate.

25. A computer-readable medium having computer executable software code stored thereon, the code for issuing a letter of credit, the code comprising:
code to issue a first letter of credit from a second party to a third party;
code to issue at least one second letter of credit from said third party to at least one fourth party, wherein the second letter of credit is issued to the at least one fourth party on behalf of a first party and further wherein the third party may draw on the first letter of credit under at least two conditions:
one condition being a credit event with respect to the first party, and
another condition being the third party is not reimbursed for a draw on the second letter of credit;
code to provide a credit facility from the second party to the first party, the credit facility associated with the first and second letters of credit; and
code to transfer credit risk from the credit facility to at least one fifth party under a participation agreement.

* * * * *